(12) United States Patent
Cawthon

(10) Patent No.: US 6,836,910 B2
(45) Date of Patent: Jan. 4, 2005

(54) COMBINATION GAME CLEANING STATION, PORTABLE SINK AND ICE CHEST

(75) Inventor: Gregory Stuart Cawthon, Mobile, AL (US)

(73) Assignee: Cawthon Enterprises, Inc., Mobile, AL (US)

( * ) Notice: Subject to any disclaimer, the term of this patent is extended or adjusted under 35 U.S.C. 154(b) by 0 days.

(21) Appl. No.: 10/212,246

(22) Filed: Aug. 6, 2002

(65) Prior Publication Data

US 2002/0184704 A1 Dec. 12, 2002

Related U.S. Application Data

(63) Continuation-in-part of application No. 09/645,927, filed on Aug. 25, 2000, now Pat. No. 6,427,259
(60) Provisional application No. 60/163,659, filed on Nov. 5, 1999.

(51) Int. Cl.[7] .............................. E03C 1/14; E03C 1/18; E03C 1/182
(52) U.S. Cl. ....................... 4/650; 4/643; 4/644; 4/646; 4/652; 4/654
(58) Field of Search ............................ 4/619, 625, 626, 4/628, 638, 639, 643, 644, 646, 650, 652, 653, 654, 656

(56) References Cited

U.S. PATENT DOCUMENTS

| | | |
|---|---|---|
| 602,494 A | 4/1898 | Briggs |
| 1,420,511 A | 6/1922 | Armstrong |
| 2,594,938 A | 4/1952 | Leavitt |
| 3,041,957 A | 7/1962 | Liptay |
| 3,566,856 A | 3/1971 | Linstead |
| 3,594,830 A | 7/1971 | Clifton |
| 3,748,437 A | 7/1973 | Keeshin et al. |
| 3,915,529 A | 10/1975 | Bernier |
| 4,213,309 A | 7/1980 | Pifer |
| 4,341,164 A | 7/1982 | Johnson |
| 4,440,185 A | 4/1984 | Wiltse |
| 4,670,144 A * | 6/1987 | McCausland et al. ....... 210/244 |
| 4,720,879 A | 1/1988 | Rabban |
| 4,747,169 A | 5/1988 | Valbuena |
| 4,766,621 A | 8/1988 | Rasor |
| 4,934,280 A | 6/1990 | Bae |
| D342,121 S | 12/1993 | Lim |
| 5,301,376 A | 4/1994 | Herbert |
| 5,313,676 A | 5/1994 | Wright |
| 5,349,708 A * | 9/1994 | Lee ............................... 4/638 |
| 5,502,848 A | 4/1996 | Cowan |
| 5,526,539 A * | 6/1996 | Bower et al. ................... 4/619 |
| 5,566,404 A | 10/1996 | Laughton |
| 5,683,157 A | 11/1997 | Peterson et al. |
| 5,813,063 A | 9/1998 | Watkins et al. |
| 5,881,404 A | 3/1999 | Knight |
| 5,926,866 A | 7/1999 | Chao |

FOREIGN PATENT DOCUMENTS

| | | |
|---|---|---|
| JP | 4-92034 | 3/1992 |
| JP | 5-9962 | 1/1993 |

* cited by examiner

Primary Examiner—Tuan Nguyen
(74) Attorney, Agent, or Firm—J. John Shimazaki

(57) ABSTRACT

The portable sink is capable of being connected to an existing water supply, such as an outdoor hose or faucet, such that running water can be provided inside the sink in an outdoor environment. The sink preferably has features that make it easy to use in any outdoor environment, such as folding legs, an adjustable spigot, a spray nozzle, a storage drawer, a shelf, a large drain, a funnel, a strainer for the drain, cutting boards, baskets, etc. The lid also enables the sink to be used as a container for storing items during travel. In this respect, the sink can be made of an insulating material so that it can double as an ice chest when desired. A pressurized water tank can be provided which is preferably sized to fit inside the sink and adapted to supply water where no other water supply is available.

20 Claims, 15 Drawing Sheets

COMBINATION GAME CLEANING STATION, PORTABLE SINK AND ICE CHEST

RELATED APPLICATIONS

This application is a continuation-in-part of U.S. patent application Ser. No. 09/645,927, filed on Aug. 25, 2000 now U.S. Pat. No. 6,427,259, which claims the benefit of the filing date of U.S. Provisional Application Ser. No. 60/163,659, filed on Nov. 5, 1999.

FIELD OF THE INVENTION

The present invention relates to the field of portable sinks, and in particular, to an outdoor portable sink that can be used to clean fish and game.

BACKGROUND OF THE INVENTION

Many outdoor activities, such as hunting, fishing, camping, etc., involve clean-up requirements for which an outdoor sink would be desirable. Although many camp grounds have running water via an outdoor faucet, most outdoor areas do not have outdoor sinks where clean-up tasks, such as cleaning fish and game, washing pots and pans, etc., can be done. Moreover, although most homes have outdoor water faucets (i.e., for attaching to garden hoses), they do not have outdoor sinks for clean-up tasks such as painting projects, washing dogs, potting plants, etc.

Some attempts have been made in the past to provide portable sinks that can be used outdoors. For example, in Leavitt, U.S. Pat. No. 2,594,938, a portable camping sink that includes a tank and tub hinged together, that can be locked together during transportation, and placed in an open position during use, is disclosed. The tank contains water used to provide the tub (sink) with its own water supply. Also, in Valbuena, U.S. Pat. No. 4,747,169, a portable camping sink with a pressurized water supply is disclosed. The sink has a main case and an open top with a hinged cover. Valbuena also provides its own water supply so that it can be used much like a sink at home. Another attempt relates to a portable kitchen unit that includes a detachable sink, shown in Peterson et al., U.S. Pat. No. 5,683,157. This sink is said to have many uses, including as a lid, lock, wash basin, stand, table, storage bin, etc. This sink, however, does not have its own water supply, and has no means of providing water; it simply shows a container that serves as a sink basin.

What is needed, therefore, is a portable sink that can not only be easily transported and set up in an outdoor environment, but that also has several optional and desirable features, including without limitation, legs that unfold to support the sink, a connection to an existing water supply, a spray nozzle for spraying water, an adjustable spigot, storage for various utensils and appliances, ledges for supporting cutting boards, shelves on the inside of a lid cover, fold-down panels, funnel/strainer assemblies, detachable faucet assmblies, double wall construction for enabling the sink to double as an ice chest, etc.

SUMMARY OF THE INVENTION

The present invention relates to a portable sink that is capable of being connected to an existing water supply, such as an outdoor hose, such that running water can be provided inside the sink in an outdoor environment. The present invention has many optional features, including legs that unfold to support the sink in an elevated position, an adjustable spigot that can be lowered and raised depending on whether the lid on the sink is opened or closed, a handle for the spigot to control the flow of water into the sink, a spray nozzle for providing a controlled spray of water which can be useful for cleaning purposes, a storage drawer for storing various utensils and appliances, a shelf extending from the lid which is adapted to be level when the lid is opened, a large drain for allowing water and debris in the sink to be easily drained out, funnels that can be extended from the drain to direct water in the appropriate direction, strainers for straining debris flowing out of the sink, supports within the sink capable of allowing cutting boards and baskets to be supported thereon, hinged counter top panels that can be folded down on each side and supported by handles to create a larger work space, a funnel/strainer having a size sufficient to hold fish and game debris that can be inserted into and/or hung down from the drain, double wall construction that enables the sink to double as a portable ice chest, a detachable faucet assembly capable of being connected to-a hose and supported on the lid, an opening to allow a hose to be extended into the sink and connected to a separate faucet assembly, and a lid that enables the sink to be used as a container for storing items during travel, etc. A pressurized water tank can be provided which is preferably sized to fit inside the sink and adapted to supply water where no other water supply exists.

DETAILED DESCRIPTION OF THE INVENTION

Figure 1:
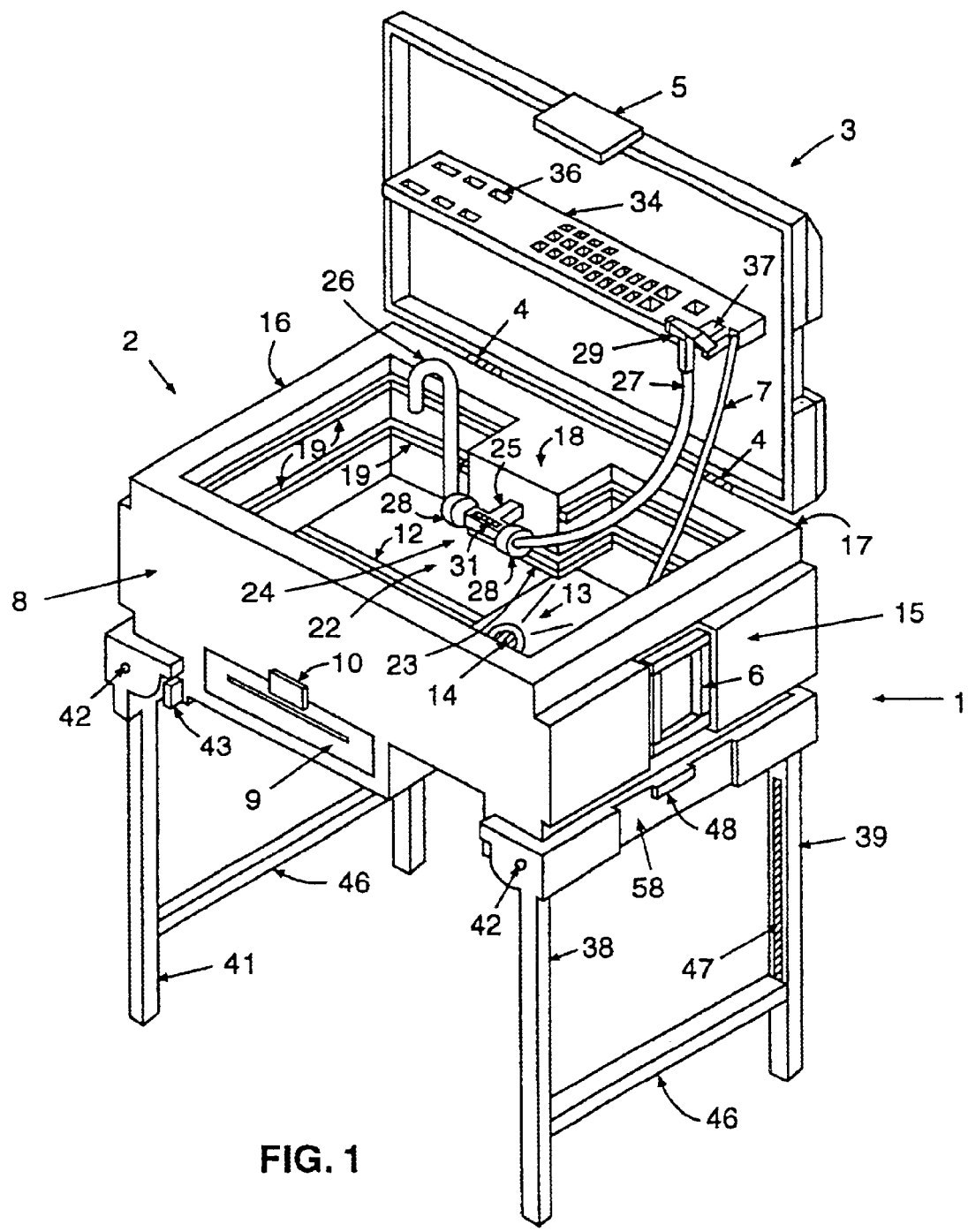
FIG. 1 is a perspective view of the present invention.

As shown in FIG. 1, the present invention relates to a portable sink 1 preferably having a sink portion 2 and lid 3 connected by hinges 4 such that lid 3 can be opened and closed. When lid 4 is closed, a latch 5 is preferably provided to secure lid 3 on sink portion 2. When lid 3 is opened, a stop 7 is preferably provided which limits the opening of the lid. The stop 7 can be a cord or chain, as is known in the art, which is hooked at one end to the sink portion 2 and the other end to the lid 3 as shown in FIG. 1. A built-in stopping means can also be provided on hinges 4.

Figure 6:
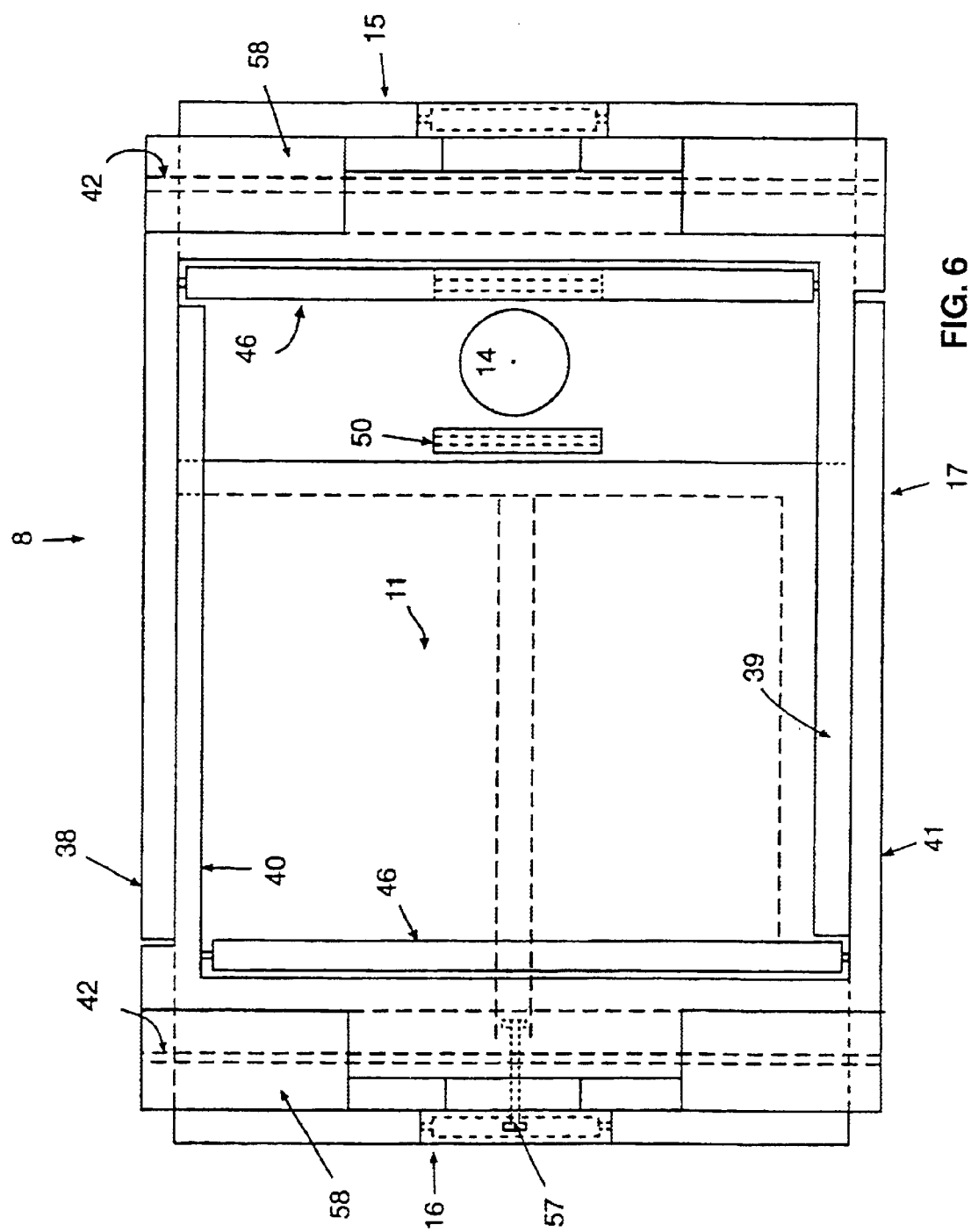
FIG. 6 is a bottom view of the present invention with legs folded.
Figure 7:
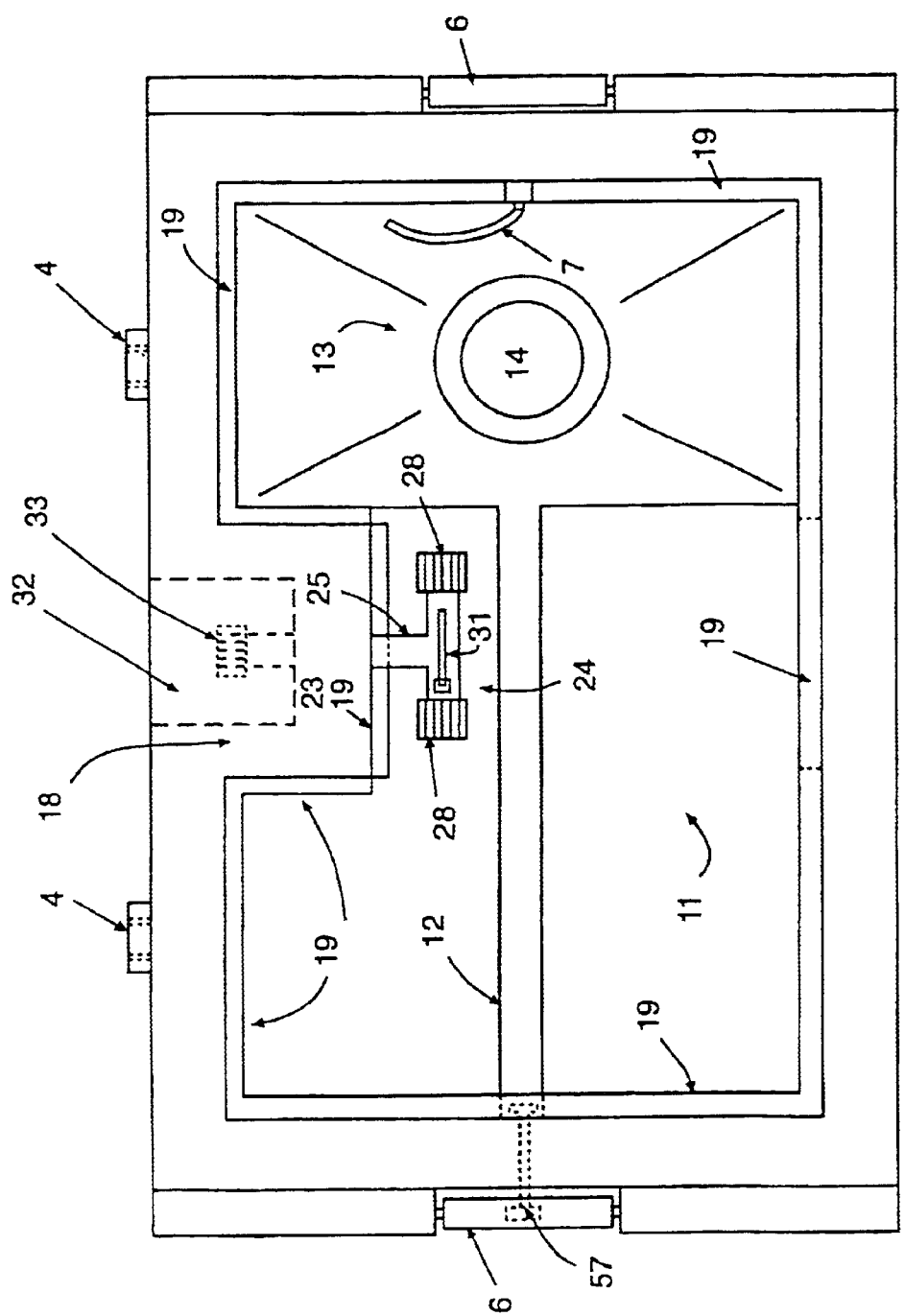
FIG. 7 is a top view of the present invention without lid.

Sink portion 2 is preferably comprised of a body having sidewalls 8, 15, 16, 17 and a floor 11 as shown in FIGS. 6–7. In one embodiment, the body can be comprised of a double wall construction, similar to an ice chest, such that the sink can double as an ice chest, and items can be stored and kept cold inside. It preferably has handles 6 on either side which can be used to carry the sink 1. The handles 6 can be any conventional type, including, for example, a loop style handle connected at both ends by a hinge, which can be swung up from the sink portion 2, as is known in the art.

Figure 2:
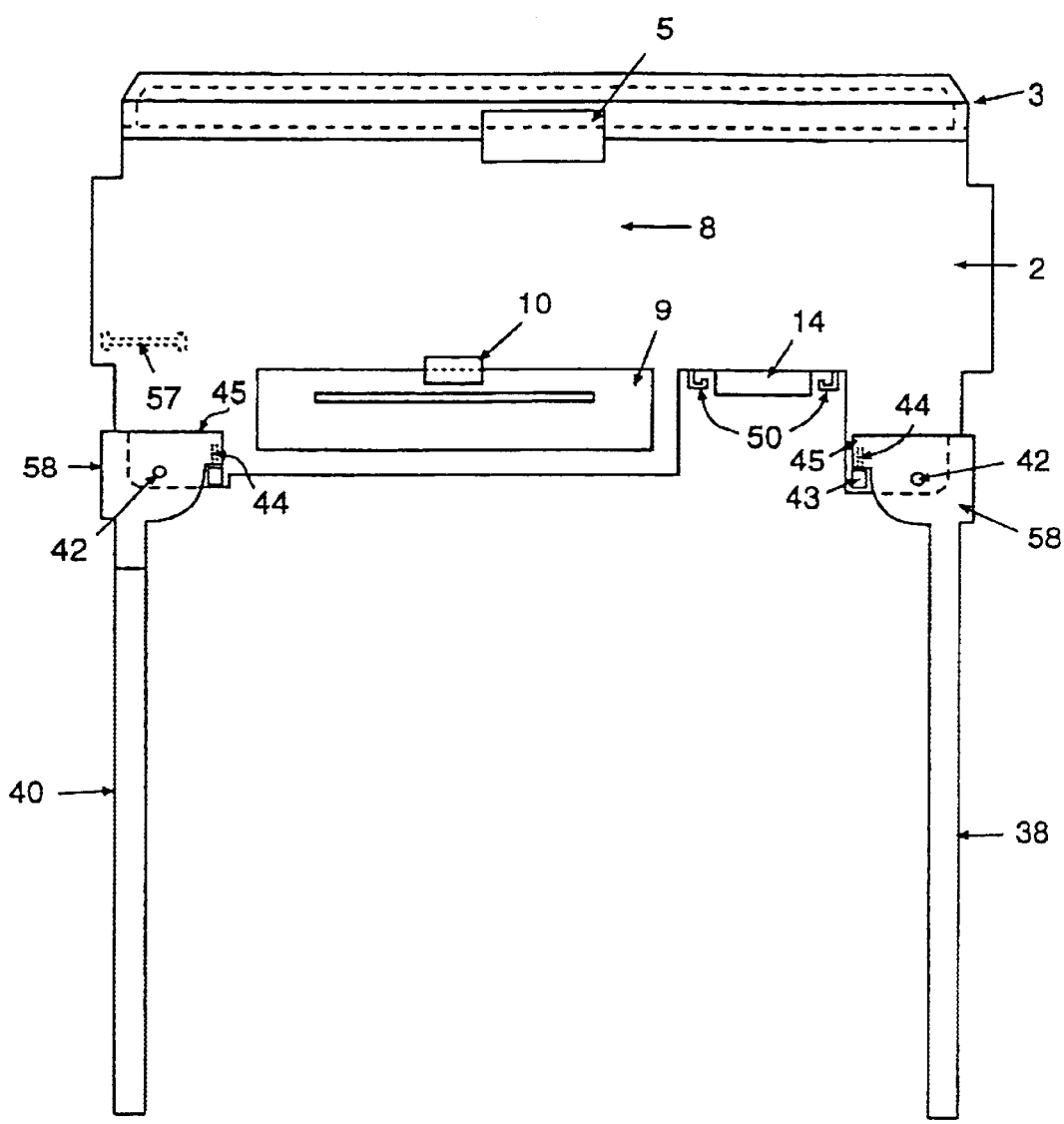
FIG. 2 is a front view of the present invention.

The sink portion 2 is preferably substantially in the shape of a rectangular box as shown in FIG. 1. Frontwall 8 is preferably provided with an opening with a drawer 9 inside having a latch 10, as shown in FIGS. 1–2, to secure the drawer in a closed position, i.e., such as during transportation. Drawer 9 is preferably built into an opening formed on frontwall 8 which extends into a cavity formed in floor 11 of sink portion 2. Drawer 9 can be made to slide in and out of sink portion 2 in any conventional manner. Drawer 9 also preferably has means for opening the drawer such as a handle or groove.

The top surface of floor 11 preferably has a groove 12 or channel extending along the center on one side thereof, as shown in FIG. 7. Groove 12 is preferably sloped and helps guide water on top of floor 11 into drain area 13. Drain area 13 is preferably sloped downward toward and around a drain 14. Preferably, drain 14 is located at the lowest point of the upper surface of floor 11 to allow water to drain out of sink portion 2 by gravity alone. Drain 14 is preferably large enough to allow debris to pass, such as fish and game parts, etc. Preferably, drain 14 has a diameter greater than that of a standard sink, with a preferred diameter being about 5 or more inches.

Figure 5:
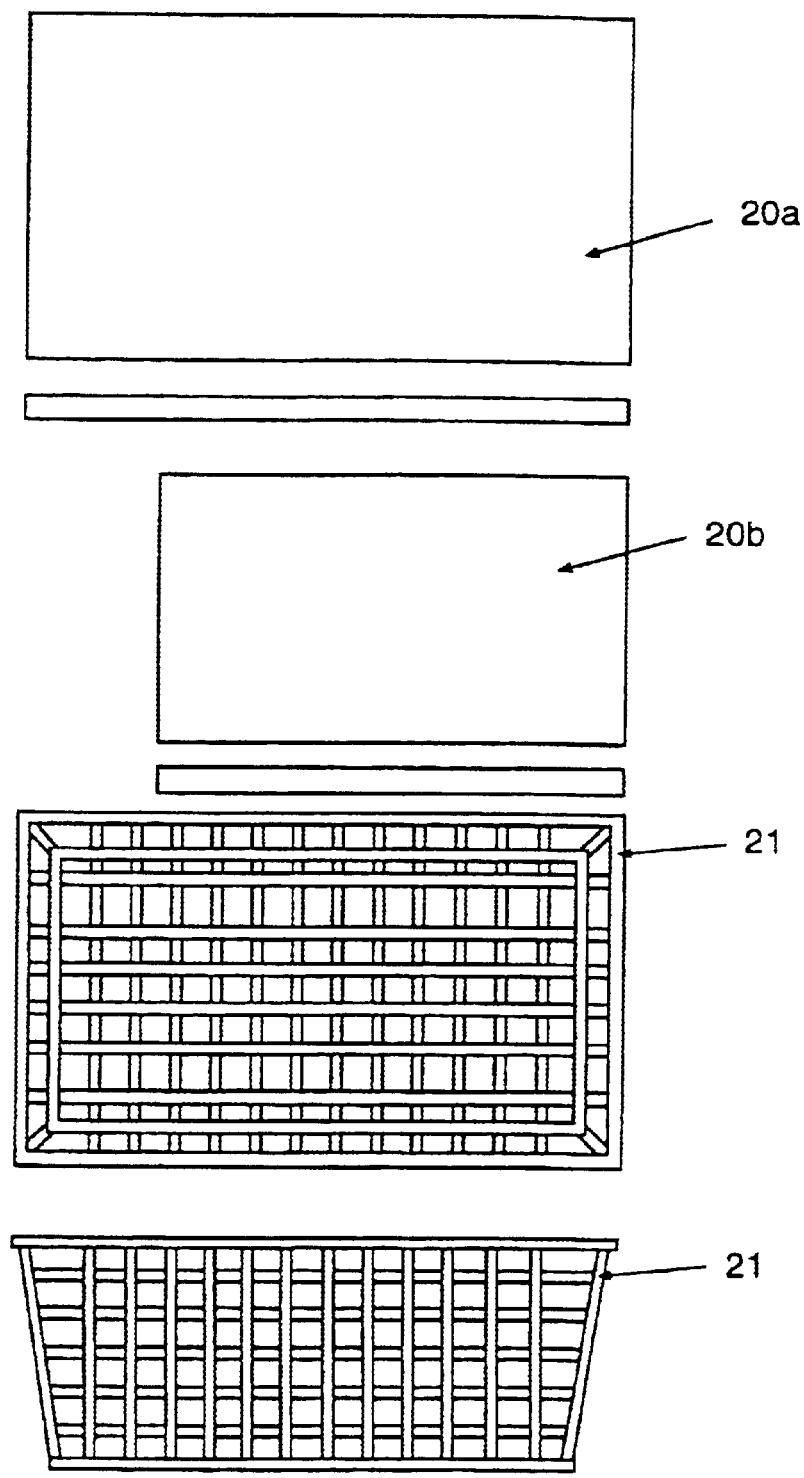
FIG. 5 shows cutting boards and baskets that can be used in the present invention.
Figure 8:
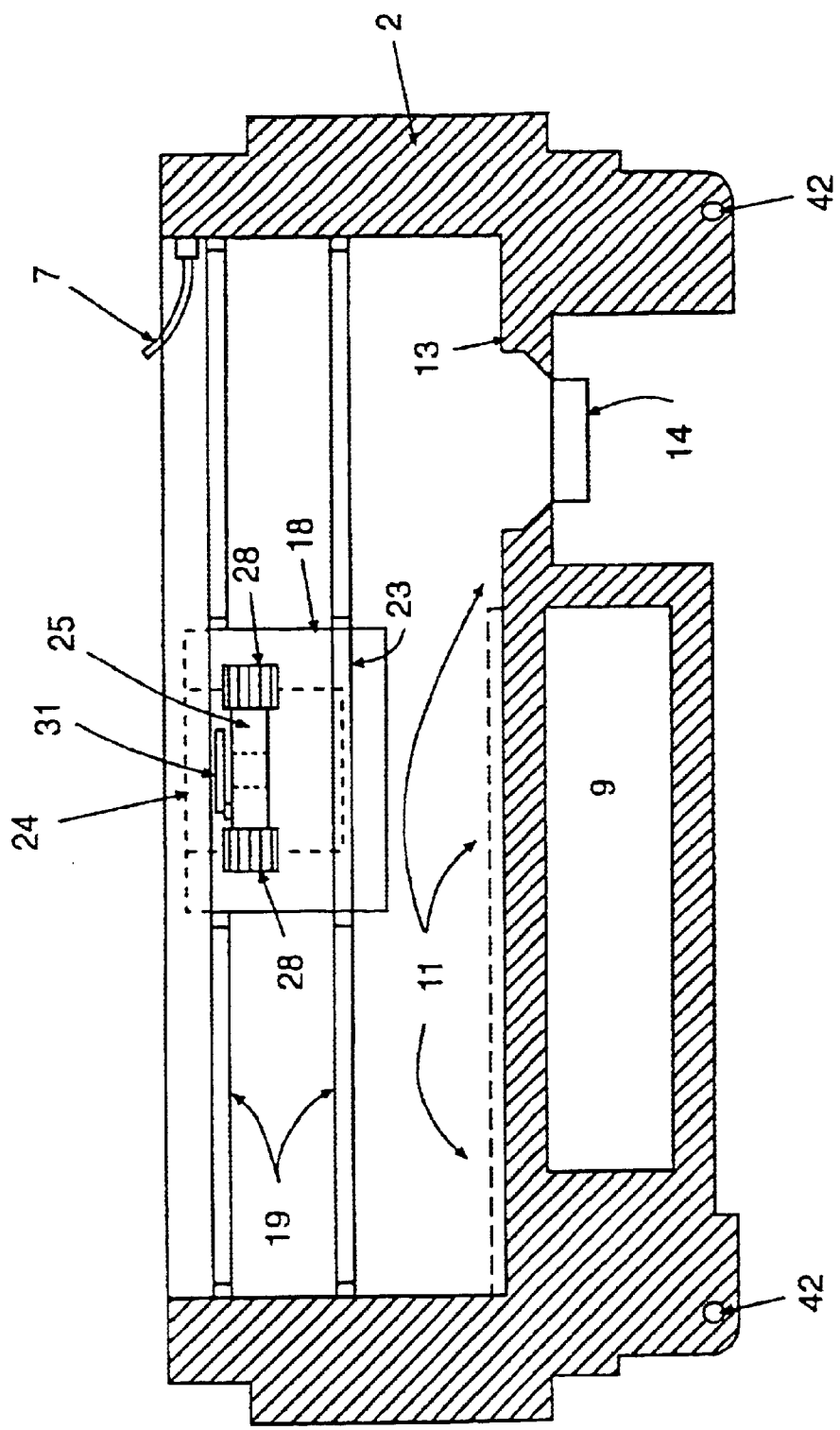
FIG. 8 is a section view of the present invention.

In the embodiment of FIG. 1, walls 8, 15, 16 and 17 preferably form a substantially rectangular shaped box, although not necessarily so, with a center section 18 extending in from the center of wall 17, as shown in FIG. 1. Along the internal surface of walls 8, 15, 16 and 17, as well as portions of center section 18, there are preferably one or more ledges 19 to support auxiliary items, such as cutting boards 20, baskets 21, as shown in FIG. 5, and dish racks, etc. Two different size cutting boards, 20a and 20b, can be provided, i.e., a large cutting board 20a can be adapted to fit in sink portion 2 on either side of center section 18, and a small cutting board 20b can be adapted to fit within a central space 22, shown in FIG. 1, in front of center section 18, spanning between wall 8 and section 18. There are preferably two ledges 19 on sink portion 2, one at a relatively low level, and one at a relatively high level, of walls 8, 15, 16, 17. The center section 18 preferably has only one lower level ledge 23, as shown in FIG. 8, to allow room for faucet assembly 24, which extends from the front of center section 18.

Figure 11:
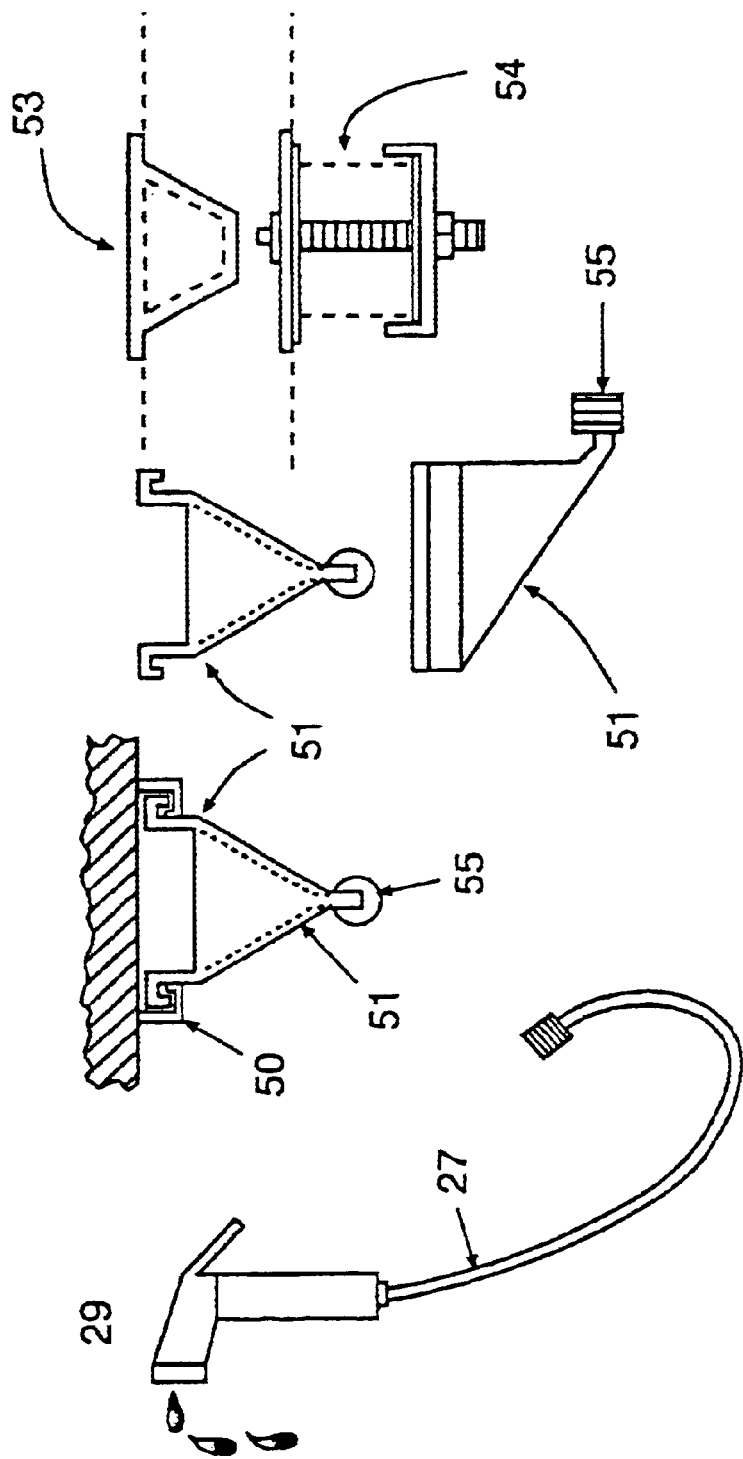
FIG. 11 shows various spray and funnel designs and plug.

Faucet assembly 24, shown in FIG. 7, preferably comprises a T-section 25 extending from section 18 which is adapted to engage spigot 26, on one end, and spray hose 27, on the other. Both spigot 26 and hose 27 preferably have threaded ends such that they can be attached and detached from T-section 25 using threaded nuts 28, shown in FIGS. 7–8. A threaded end of spigot 26, for example, can be adapted to engage threaded nut 28 on one end of T-section 25, wherein by loosening threaded nut 28 on spigot 26, the spigot can be rotated up or down. When lid 3 is open, spigot 26 can be extended up vertically, but spigot 26 can also be rotated down to allow the lid 3 to be closed when desired. In this respect, threaded nut 28 can preferably be used to hold spigot 26 at various angles if desired. Spray hose 27 preferably has a spray nozzle 29 with a handle attached thereto as shown in FIG. 11. Spray nozzle 29 can be like any conventional spray nozzle with a handle and handle-operated valve.

Figure 9:
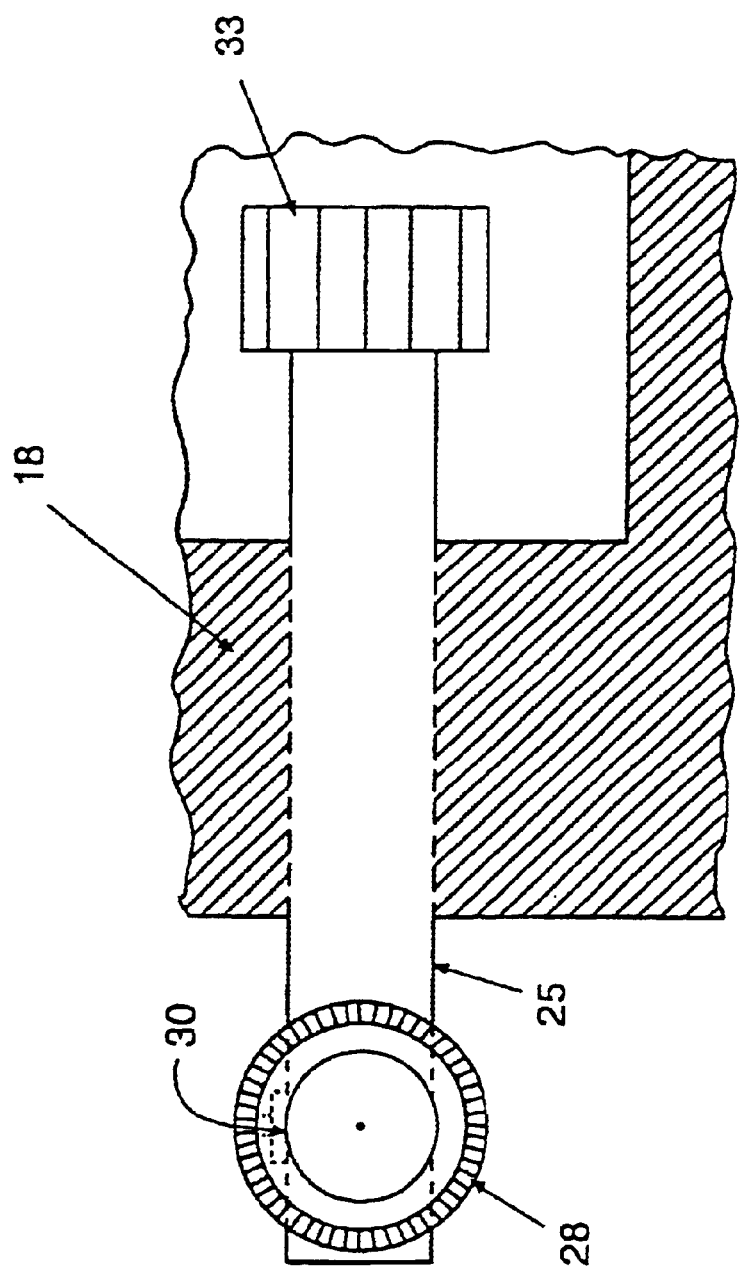
FIG. 9 is a section view of the t-section.

Within T-section 25 is preferably a valve 30, as shown in FIG. 9, which can be any conventional type. The valve 30 is preferably operatively associated with handle 31, shown in FIG. 7, on T-section 25, to control the supply of running water through spigot 26. Handle 31 operates valve 30 so that water under pressure can be released by turning handle 31 in the conventional manner. A valve is not required on the opposite side of T-section 25 since spray nozzle 29 preferably has its own valve.

Figure 3:
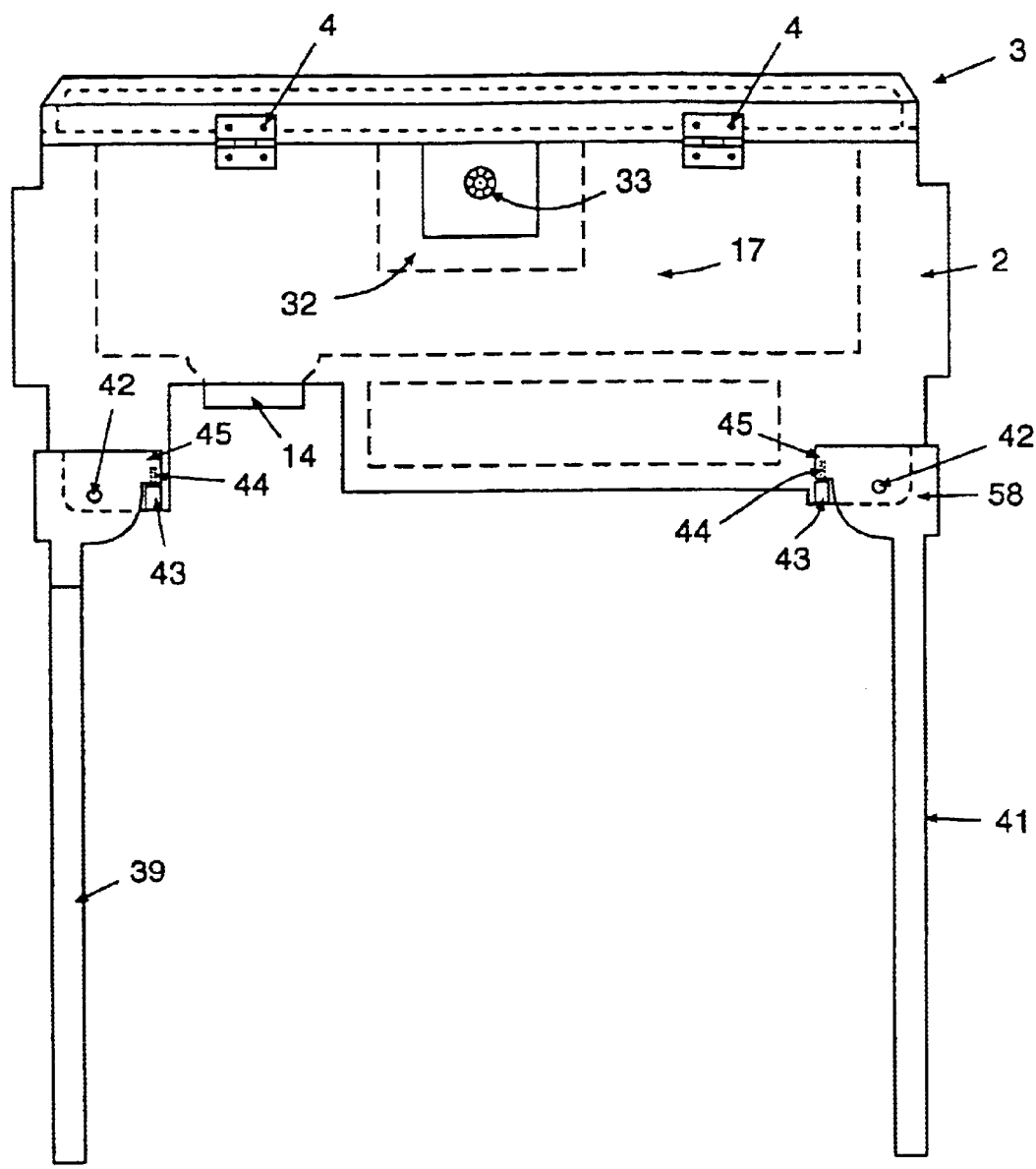
FIG. 3 is rear view of the present invention.
Figure 4:
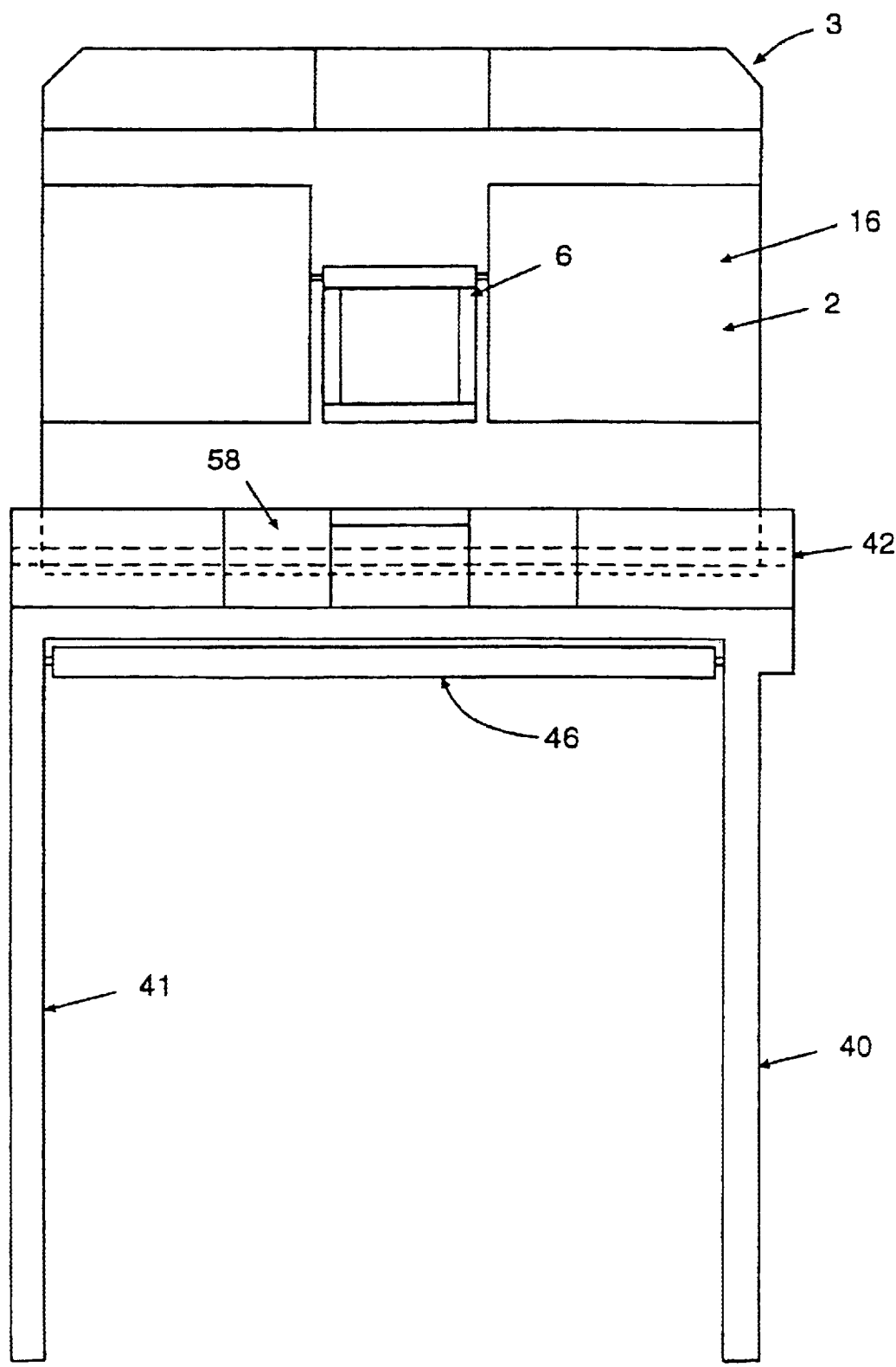
FIG. 4 is a side view of the present invention.

On the backside of section 18 and wall 17 is preferably an indentation area 32 with a hose connection 33, as shown in FIGS. 3 and 7. Indentation 32 keeps connection 33 from protruding out the back wall 17, which makes storing sink 1 easy. The hose connection 33 preferably comprises a pipe structure having an opening that extends through section 18 to communicate with T-section 25, as shown in FIG. 9. Hose connection 33 is preferably adapted to connect sink 1 to an existing water supply. It preferably comprises a nut with an internal thread into which the threaded end of a standard size hose (not shown) can be attached. In this respect, connection 33 can be any conventional type connection which enables an externally threaded hose or pipe to be inserted and connected thereto. An adapter (not shown) to enable connection 33 to be used in connection with an internally threaded connector or different size pipe can also be provided.

Figure 10:
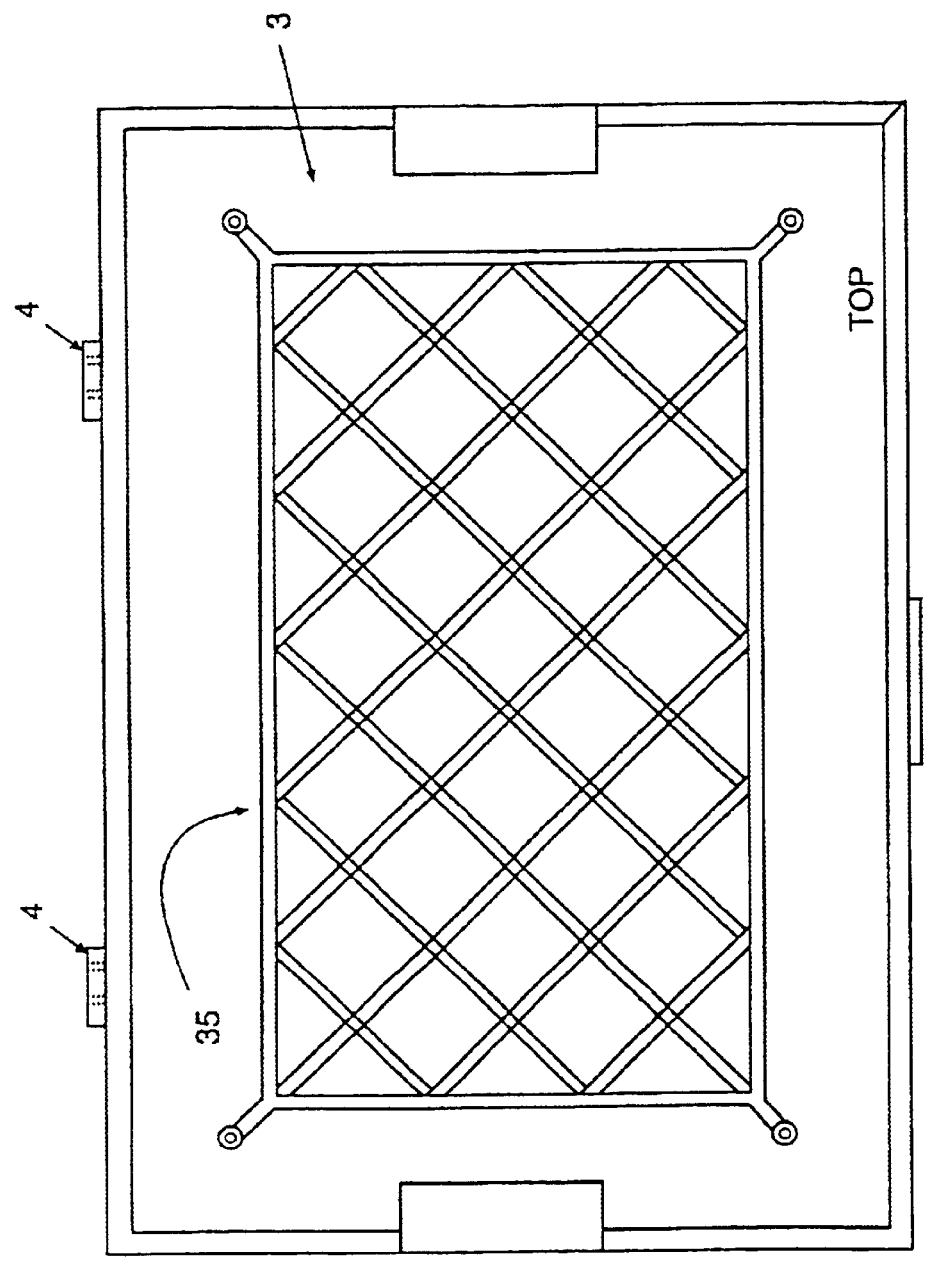
FIG. 10 a front view of the mesh embodiment of the lid.

The inside of lid 3 preferably has a shelf 34, as shown in FIG. 1, or basket (not shown), thereon. Shelf 34 is preferably secured to the inside of lid 3 such that when lid 3 is upright, shelf 34 is substantially horizontal. Openings 36 of various sizes are preferably provided on shelf 34 for holding utensils such as knives, toothbrushes, spoons, forks, etc. A hook 37 is also preferably provided for hanging spray nozzle 29. Stop cord 7 can also be secured to shelf 34 or directly to lid 3. An elastic mesh net 35, such as an elastic cargo net, as shown in FIG. 10, can also be provided on the outside of lid 3. Mesh 35 is preferably secured to lid 3 at its four corners and enables items such as towels, blankets, etc. to be stored therein.

Below sink body portion 2 are preferably legs 38, 39, 40 and 41. Each leg extends from a hinge 42 which allows the legs to swing from a tucked position under the sink portion 2 to an extended upright position as shown in FIGS. 1 and 2. When extended, legs 38, 39, 40 and 41 can be locked in their upright position by a locking mechanism 43, comprising a pin 44 that mates with a spring tension latch 45, as shown in FIG. 2. Tension on latch 45 is preferably tight enough to support legs 38, 39, 40 and 41 in their upright positions, while loose enough to allow the legs to be easily pushed into their tucked position, as shown in FIG. 6. Enough friction is preferably provided by hinge 42 to hold legs 38, 39, 40, 41 in their tucked position.

Legs 38, 39, 40 and 41 are preferably offset (from one side to the other), as shown in FIG. 6, i.e., legs 38 and 39, which extend from the right side, are offset toward the front of the sink 2, and legs 40 and 41, which extend from the left side, are offset toward the back of the sink 2, such that all four legs can be swung up into the tucked position without overlapping each other (to be more compact). The legs can also be offset in the opposite direction. Crossbars 46 preferably extend between legs 38 and 39, and 40 and 41, respectively, and can preferably slide up and down along grooves 47 extending along a portion of the length of the legs as shown in FIG. 1. When moved up, the crossbars 46 are moved out of the way so that they advantageously allow the legs to fold up into the tucked position. When the legs are swung down to their upright positions, the crossbars 46 can be slid down to help support and provide rigidity to the legs. Legs 38, 39, on one side of sink portion 2 are preferably connected at the top by lateral member 58, and legs 40, 41, on the other side of sink portion 2, are likewise connected at the top by another lateral member 58 on the other side. Hinges 42 operate with friction to allow lateral members 58 to pivot, and therefore, legs 38, 39, 40, 41 to be swung up and down. Protruding knob 48, as shown in FIG. 1, can be provided on lateral member 58 to help enable the legs to be easily grasped and extended in the upright position.

Figure 12:
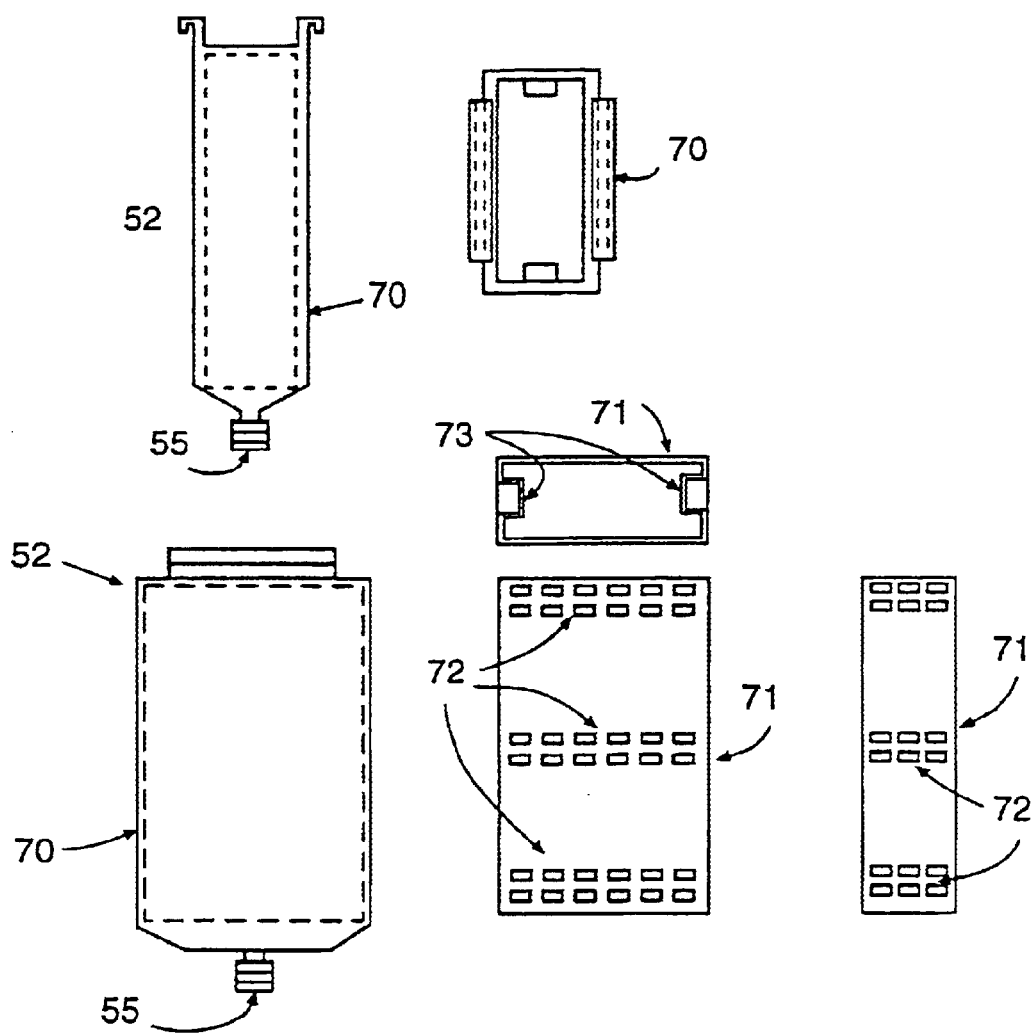
FIG. 12 shows a strainer funnel with outer housing.

Extending below floor 11 beneath drain 14 is preferably a funnel hanging assembly 50, as shown in FIG. 11. Drain 14 extends through floor 11 and preferably has an opening sufficient in size so that water and other debris such as fish and game parts can flow through and out from the bottom of the sink portion 2. Various funnel designs 51 and 52, as shown in FIGS. 11 and 12, can be supported by funnel assembly 50. Moreover, drain 14 can be designed to enable a strainer to be hung down from the edge of the drain 14.

Assembly 50 preferably comprises support runners on the underside of the floor on which funnels 51, 52, can slide. Funnel 51 has a lower opening 55 through which water can be drained. Opening 55 is preferably adapted to be connected to a hose, and can be used to divert water from sink 1 in a predetermined direction, i.e., so that water and debris do not pour out onto the user's feet. Funnel 51 can also be angled as shown to help divert water in a specific direction, i.e., such as backwards away from the user's feet.

A strainer 53 as well as a plug 54, shown in FIG. 11, can also be used in association with drain 14. Strainer 53 can be any conventional type that fits on top and into drain 14 inside sink portion 2. Plug 54 can also be any conventional type, such as one that can fit above and below drain 14 to seal the opening therein. In this respect, the top piece of plug 54 is preferably adapted to seal the drain opening 14 on floor 11, and the bottom piece is adapted to be held together with a bolt that can be tightened from beneath the sink portion 2. Plug 54 can be used to seal drain 14, such as when sink 1 is not in use, or when it is desirable to maintain water in sink portion 2. An additional smaller drain 57 can also be provided on sink portion 2, such as along side wall 16, as shown in FIG. 1. Drain 57 can be like any conventional drain with a plug, such as those used on ice chests.

Funnel 52, shown in FIG. 12, can also be used with a strainer 71 to capture debris and allow water to flow through opening 55 from drain 14 of sink portion 2. Funnel 52 and strainer 71 can be used to remove debris during cleanup tasks, such as removing fish and game parts, etc., while allowing water to drain out. Funnel 52 preferably has an outer funnel portion 70, which has means for hanging from funnel assembly 50, and an inner strainer 71, which can be supported by outer portion 70. Inner strainer 71 has a plurality of holes or perforations 72 through which water can pass, but which are small enough to catch debris. The inner strainer 71 preferably is sized so that it can be easily fitted into outer portion 70 from above, and preferably has handles 73 for easy insertion and removal.

Figure 13:
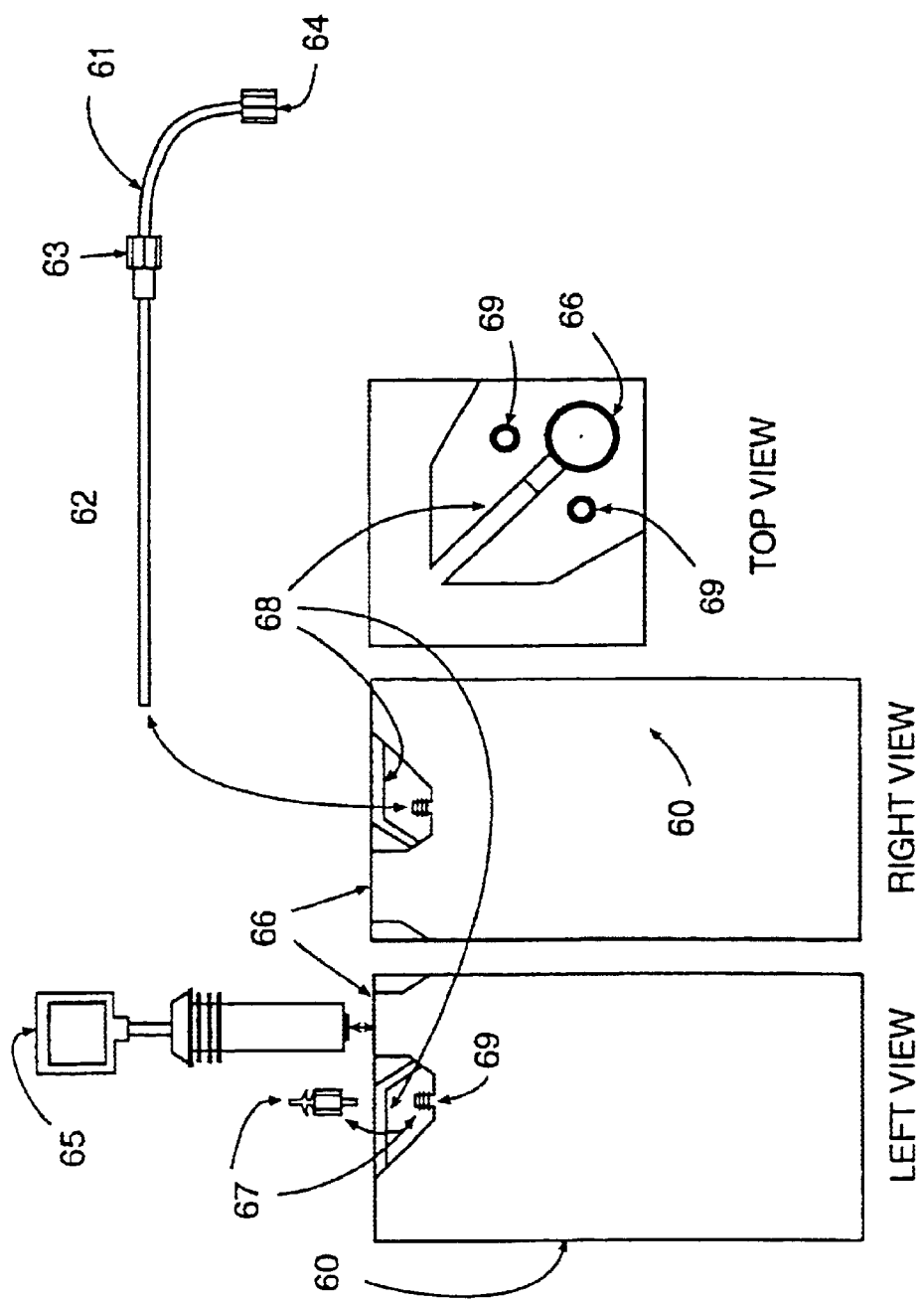
FIG. 13 shows a pressurized tank.

A portable water source, such as a pressurized tank 60, as shown in FIG. 13, can also be provided. Tank 60 can be sized and shaped so that it can be transported inside of sink portion 2, if desired, although preferably it is a standard tank. A water input spout 66 is preferably provided on the top, as well as two output openings 69. A hose 61 is preferably provided with a tube 62 (adapted to be fitted inside the tank) on one end, which has a threaded connector 63 adapted to be connected to one of the openings 69 on tank 60. On the other end of hose 61 is a second threaded connector 64 adapted to be connected to the hose connection 33 on sink portion 2 to supply water to sink 1. A hand operated pump 65, which is preferably adapted to be connected to input spout 66, can also be provided to add pressure into tank 60. A valve 67 can be provided on the other output opening 69 to release pressure when needed. A carrying handle 68 can also be provided for easy lifting.

Figure 14:
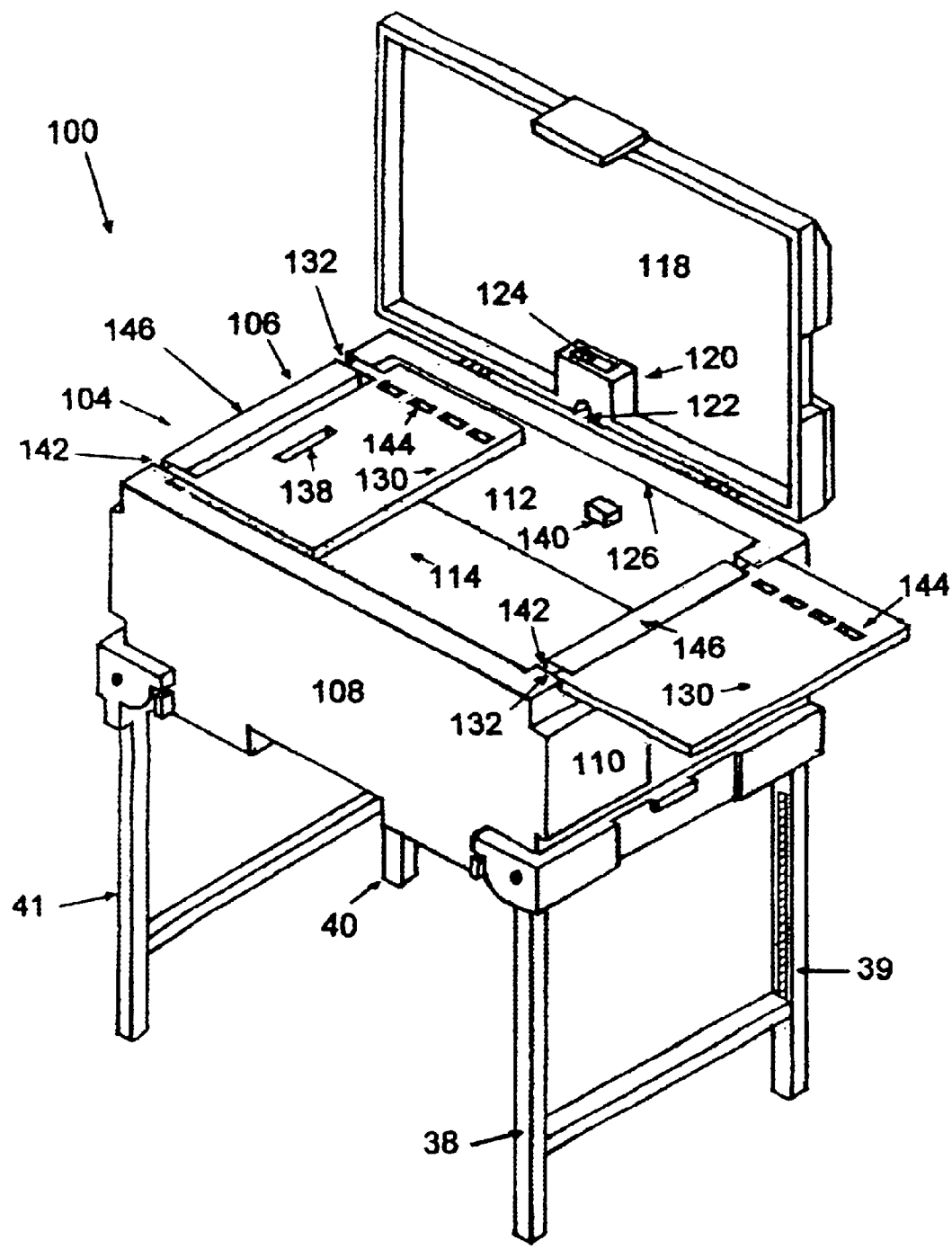
FIGS. 14 and 15 show different views of an alternate embodiment.
Figure 15:
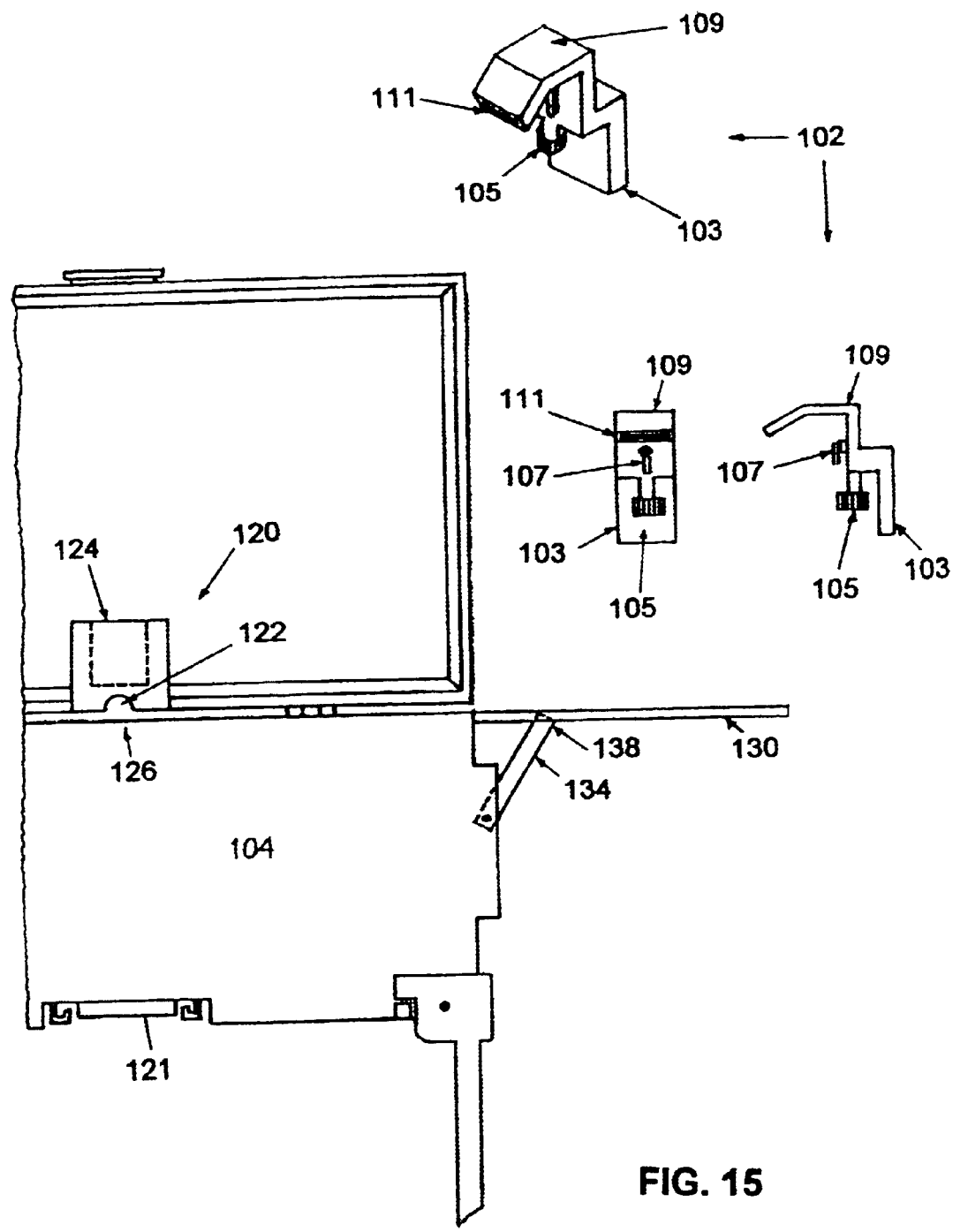

In the embodiment 100 of FIGS. 14 and 15, a simplified sink body portion 104 with a detachable modified faucet assembly 102 that is more economical to produce is shown. Sink portion 104 preferably has four walls, 106, 108, 110 and 112, and a floor 114, and a hinged lid 118. It also preferably has legs 38, 39, 40, 41, although not necessarily so, handles 134, a drain 121, etc., and in this respect, is similar to the previous sink portion 2. Sink portion 104, however, preferably does not have a built-in extension 18, nor anything relating to the plumbing connection 33, such as faucet assembly 24, a spigot 26, etc., like those of the previous embodiment. Instead, a modified faucet assembly 102, which can be attached and detached, is preferably provided.

Modified faucet assebmly 102, as shown in FIG. 15, preferably has a lower insert portion 103, a threaded attachment section 105, a valve and lever 107 for adjusting the flow of water, an extension 109 and opening 111, through which water can flow. Attachment section 105 is preferably adapted with threads so that the threaded end of a conventional hose can be connected thereto, wherein water can then be supplied through the hose (not shown), via valve and lever 107, to extension 109 and opening 111, and into sink portion 104.

A support assembly 120, as shown in FIGS. 14 and 15, is preferably located on the inside of lid 118, for detachably supporting faucet assembly 102. Support assembly 120 preferably comprises a support cavity 124 into which lower insert portion 103 of modified faucet assembly 102 can be inserted and supported thereby. Any means of supporting faucet assembly 102, such as a post for inserting into a hole located on faucet assembly 102 (not shown), are contemplated. Support assembly 120 also preferably comprises an opening 122, which is preferably circular or semi-circular, extended through lid 118, through which the hose can be extended from behind lid 118. Although opening 122 is shown to be located on support assembly 120, it can be located anywhere that provides the desired results, as will be discussed.

When faucet assembly 102 is to be used, lid 118 is preferably opened to an upright position, as shown, which can be held by a chain, locked hinge or other conventional means as discussed previously. The hose can then be extended through opening 122, i.e., from behind lid 118, such that the hose is extended into sink portion 104. This way, the threaded end of the hose can be connected to attachment section 105 of faucet assembly 102, such that the hose can be connected to faucet assembly 102. Moreover, the lower insert portion 103 can be inserted into support cavity 124, such that faucet assembly 102 is supported thereby, wherein the end of the hose can be bent upward in engagement with attachment section 105 of faucet assembly 102. This way, the hose can be extended through opening 122 and attached to faucet assembly 102, wherein the faucet assembly 102 can be positioned on lid 188, where it an be used as a faucet, via valve and lever 107, to supply water into sink portion 104.

When faucet assembly 102 is not being used, it can be detached from support assembly 120 simply by lifting faucet assembly 102 out of support cavity 124. Then, the hose can be disconnected from attachment section 105, such that faucet assembly 102 can be removed and stored away separately. Lid 118 can then be closed to seal sink portion 104 with no obstruction from support assembly 120, the hose or faucet assembly 102. In this respect, support assembly 120 and opening 122 are preferably located on lid 118 in a manner that allows lid 118 to be closed, with opening 122 oriented in a manner that keeps it outside sink portion 104, so that it provides no access into sink portion 104. That is, opening 122 is preferably located on a portion of lid 118 that closes down onto an upper edge 126 of wall 112, such that when lid 118 is closed, opening 122 will not allow access into sink portion 104, thereby allowing sink portion 104 to be substantially sealed thereby.

An advantage of this embodiment is that sink portion 104 can be made without any built-in plumbing connection. That is, it can be made like a standard sink basin, or, it can be made like a portable ice chest with double wall construction, so that it can double as an ice chest. When made like an ice chest, the present invention contemplates that sink portion 104 can be made with a relatively large drain sufficient for allowing fish and game parts to be pushed through. In this embodiment, the construction of sink portion 104 does not require any other features discussed in relation to the previous embodiment, although they can be provided.

This embodiment is also shown with optional fold-down counter top panels 130. Each panel 130 is preferably connected by hinges 132 that are built into walls 106, 110, such that panels 130 can be pivoted from a closed position, as shown on the left hand side of FIG. 14, wherein panels 130 are positioned inward over sink portion 104, and an open position, as shown on the right hand side of FIG. 14, wherein panels 130 are swung open and outward as shown. Handles 134 are preferably provided on walls 106 and 110 to support panels 130. That is, handles 134 are preferably made so that they can be swung up and wedged into a locked position in panel 130, as shown in FIG. 15, wherein cut-outs or notches 138 are preferably provided on panels 130 into which handles 134 can be inserted. The cut-outs 138 are preferably located on panels 130, based on the size and position of handles 134, such that panels 130 can be held in the open position and in a substantially horizontal orientation. Supports 140 on sink portion 104 can be provided to support panels 130 in the closed position.

Openings 144 for supporting utensils and the like can be provided on panels 130. Hinges 132 are preferably constructed to fit into openings 142 along an upper edge 146 of walls 106, 110, so that when lid 118 is closed, sink portion 104 can be substantially sealed thereby.

The main components of the present invention are preferably made of materials similar to those used to construct ice boxes and ice chests, such as plastic, aluminum, metal, etc. In one embodiment of the present invention, the pieces are made of materials that have insulation properties, and/or double wall construction. In this way, the present invention can double as an ice chest. This can be useful on fishing and hunting trips, wherein fish and game parts can be cleaned in sink 1 or 100, and then stored with ice inside sink portion 2 or 104, wherein lid 3 or 118 can be closed for easy transport home.

The other components of the present invention can be made of any conventional material. For example, the legs, handles, drawers, shelves, latches, funnels, panels, strainers, support assemblies, faucet assemblies, etc. can be made of plastic, or other moldable material, or from the same materials used to make lid 3 or 118 and sink portion 2 or 104, etc.

Any conventional materials can also be used to make items such as the connections, hoses, spigots, tanks, pumps, tubes, valves, liners, spray nozzles, meshes, baskets, cutting boards, cords, chains, plugs, hinges, nuts, handles, pins, latches, faucet assemblies, levers, threads, attachments, etc.

In use, the present invention can be set up on a table with legs 38, 39, 40, 41 tucked up, or on the ground and elevated with the legs extended, so that sink 1 or 100 can be raised to about the same height as a standard counter top. When extending legs 38, 39, 40, 41, tension between latch 45 and pin 44 helps maintain the legs in the upright position. Crossbars 46 can be slid down to help support legs 38, 39, 40, 41.

Latch 5 can be unhooked to open lid 3 or 118 to an upright position and limited by stop 7. In the embodiment of FIG. 1, spigot 26 can be rotated up or down by loosening and tightening nut 28. Connection 33 can be used to connect sink 1 to an existing water supply such as a garden hose. In this respect, a separate hose can be carried in sink portion 2 so that it can be used to connect sink 1 to an outdoor water faucet when desired. Tank 60 can also be carried inside sink 1 and used where no existing water supply is available.

With sink 1 connected to a water supply, handle 31 can control valve 30 and be used to run water through spigot 26. Spray nozzle 29 can also be used to spray water through hose 27. Cutting boards 20 or basket 21 can be positioned on ledges 19 as discussed. Shelf 34 can be used to hold utensils, such as knives, forks, etc., as well as spray nozzle 29. Elastic mesh 35 can be used, such as during transport, for storing blankets, towels, etc. Drawer 9 is available to store items such as cutting boards 20, basket 21, utensils, etc. The cutting boards 20 are preferably sized so that they can be placed in drawer 9.

Funnels 51, 52, strainer 71, 53 and plug 54 can be used as needed. Funnels 51, 52 can be used with a second hose to divert water away from the user. Funnel 52 and strainer 71 can be used to strain debris from water flowing out of sink 2, while strainer 53 can be used in drain 14 to strain smaller particles. Plug 54 can be used to seal drain 14. Smaller drain and plug 57 can be used as an auxiliary means of draining water without removing plug 54.

When done, crossbars 46 can be raised and legs 38, 39, 40, 41 can be tucked up into the tucked position and held by friction with hinges 42. Spigot 26 can be moved back to a lower position. Spray nozzle 29 can be removed and stored in sink portion 2. The hose can be disconnected from connection 33 and placed inside the sink 1. All utensils, funnels, boards, baskets, etc., can be stored in sink 1 or drawer 9. Lid 3 can be closed with latch 5. Handles 6 can be used to carry sink 1.

In the embodiments of FIGS. 14–15, with lid 118 in an upright position, the hose is extended through opening 122, i.e., from behind lid 118. The threaded end of the hose is then connected to attachment section 105 of faucet assembly 102. Then, lower insert portion 103 is inserted into support cavity 124, such that faucet assembly 102 is supported on lid 118 above sink portion 104. This way, the hose is extended through opening 122 and attached to faucet assembly 102, wherein faucet assembly 102 can supply water into sink portion 104.

Moreover, panels 130 can be pivoted from the closed position to the open position. In the closed position, panels 130 rest on supports 140. To open, handles 134 are preferably raised, and panels 130 opened and positioned over handles 134, until handles 134 are inserted into cut-outs 138. Cut-outs 138 and handles 134 are preferably designed so that in a locked postion, panels 130 are extended substantially horizontally outward from walls 106 and 110. To close panels 130, they are simply lifted up from the locked postion, and pivoted back onto supports 140.

When finished, faucet assembly 102 is detached from support assembly 120 simply by lifting faucet assembly 102 out of support cavity 124. Then, the hose is disconnected from attachment section 105, and faucet assembly 102 is removed and stored. Lid 118 can then be closed to seal sink portion 104, wherein there is no obstruction from support assembly 120, or faucet assembly 102. Also, opening 122 is oriented in a manner that causes it to be on the outside of lid 118 when lid 118 is closed, such that no access into sink portion 104 is provided, and sink portion 104 can be substantially sealed by lid 118.

The present invention has been described in terms of the preferred embodiments described above. While a preferred embodiment may have all of the features that have been described, the present invention contemplates that a portable sink having fewer than all of the features described above would still be within the scope of the present invention. In this respect, the present invention is intended to incorporate one or more of the features described above, as defined by the claims that follow.

What is claimed is:

1. A portable sink, comprising:
    a body portion having a sink therein;
    a lid portion pivotally connected to said body portion for covering said sink, said lid portion capable of being pivoted between a closed position and an open position, wherein said body and lid portions are adapted such that with said lid portion in said closed position, said lid and body portions form a substantially closed compartment for preventing water from inside said sink from spilling out;
    a cut-out or indented opening in said lid portion, through which a hose can be extended into said body portion when said lid portion is in said open position, wherein with said lid portion in said closed position, the hose is prevented from extending into said body portion;
    a support assembly provided on the inside of said lid portion for supporting a detachable faucet assembly located at the end of the hose; and
    a drain on said body portion through which water can flow out.

2. The sink of claim 1, wherein said faucet assembly has an insert portion that can be inserted into a cavity on said support assembly, and wherein said faucet assembly has an attachment section for connecting to the hose.

3. The sink of claim 1, wherein said lid portion is provided with a stop connected to said body portion for limiting the opening movement of said lid portion to about perpendicular to said closed position.

4. The sink of claim 1, wherein said opening is adapted such that its effective size for allowing the hose to be extended through is greatest when said lid portion is opened to about perpendicular to said closed position.

5. The sink of claim 1, wherein said body portion has extending therefrom multiple legs for supporting said sink in an upright position, wherein said legs are hinged so that they can be moved between an upward tucked position under a floor of said body portion and a lower extended position which allows said body portion to be in said upright position.

6. The sink of claim 1, wherein a hanging assembly is provided under said body portion below said drain, said hanging assembly being adapted to support one or more auxiliary items thereon.

7. The sink of claim 6, wherein said one or more auxiliary items comprises a funnel capable of having a second hose connected thereto for directing water flowing out of said drain in a predetermined direction or a funnel adapted to have a strainer inserted therein.

8. The sink of claim 1, wherein said body portion has two sidewalls, two end walls, and a floor, and wherein a carrying handle is provided on each of said two end walls, to enable said body portion to be carried by a user, and wherein a fold-out panel is pivotally mounted on at least one of said end walls, wherein in a closed position, said panel can rest on said body portion in a substantially horizontal position over said sink, and in an open position, said panel can be extended and supported by at least one of said handles in a substantially horizontal position outside said sink.

9. The sink of claim 8, wherein said handles are pivoting handles extending from said end walls, and wherein said panel is adapted with a support portion located on the underside thereof, which allows said pivoting handles to be positioned and substantially wedged into said support, to support said panel in said extended and substantially horizontal position.

10. The sink of claim 8, wherein at least one of said at least one panel comprises a cutting board, and has at least one opening for supporting at least one utensil thereon.

11. The sink of claim 1, wherein said body portion is adapted such that a cutting board or like member can be positioned on said body portion, over at least a portion of said sink.

12. A portable sink, comprising:
    a body portion having a sink therein;
    a lid portion pivotally connected to said body portion for covering said sink, said lid portion capable of being pivoted between a closed position and an open position that is substantially perpendicular to said closed position, wherein said body and lid portions are adapted such that with said lid portion in said closed position, said lid and body portions form a substantially closed compartment; and
    an opening in said lid portion, through which a hose can be extended into said body portion when said lid portion is in said open position, wherein with said lid portion in said closed position, the hose is prevented from extending into said body portion through said opening, by virtue of said opening's position relative to said body portion.

13. The sink of claim 12, wherein a support assembly is provided on the inside of said lid portion for supporting a detachable faucet assembly, wherein said faucet assembly has an insert portion that can be inserted into a cavity on said support assembly, and wherein said faucet assembly has an attachment section for connecting to the hose.

14. The sink of claim 12, wherein said lid portion is provided with a stop connected to said body portion for limiting the opening movement of said lid portion, and wherein said opening is adapted such that its effective size for allowing the hose to be extended through is greatest when said lid portion is opened to said open position.

15. The sink of claim 12, wherein said body portion has extending therefrom multiple legs for supporting said sink in an upright position.

16. The sink of claim 12, wherein a drain is provided on said body portion, and a hanging assembly is provided under said body portion below said drain, said hanging assembly being adapted to support one or more auxiliary items thereon.

17. The sink of claim 12, wherein at least two carrying handles are provided on said body portion, and wherein at least one fold-out panel is pivotally mounted on said body portion, wherein in a closed position, said panel can rest on said body portion in a substantially horizontal position over said sink, and in an open position, said panel can be extended and supported by at least one of said handles in a substantially horizontal position outside said sink.

18. The sink of claim 17, wherein said handles are pivoting handles extending from said body portion, and wherein said panel is adapted with a support portion located on the underside thereof, which allows one of said pivoting handles to be positioned and substantially wedged into said support, to support said panel in said extended and substantially horizontal position.

19. The sink of claim 17, wherein at least one of said at least one panel comprises a cutting board, and has at least one opening for supporting at least one utensil thereon.

20. The sink of claim 12, wherein said body portion is adapted such that a cutting board or like member can be positioned on said body portion, over at least a portion of said sink.

\* \* \* \* \*